Sept. 10, 1935.   C. H. DOOLEY   2,014,105
FILTER
Filed May 31, 1933   3 Sheets-Sheet 1

Inventor:
Clarence H. Dooley
By:
Attys.

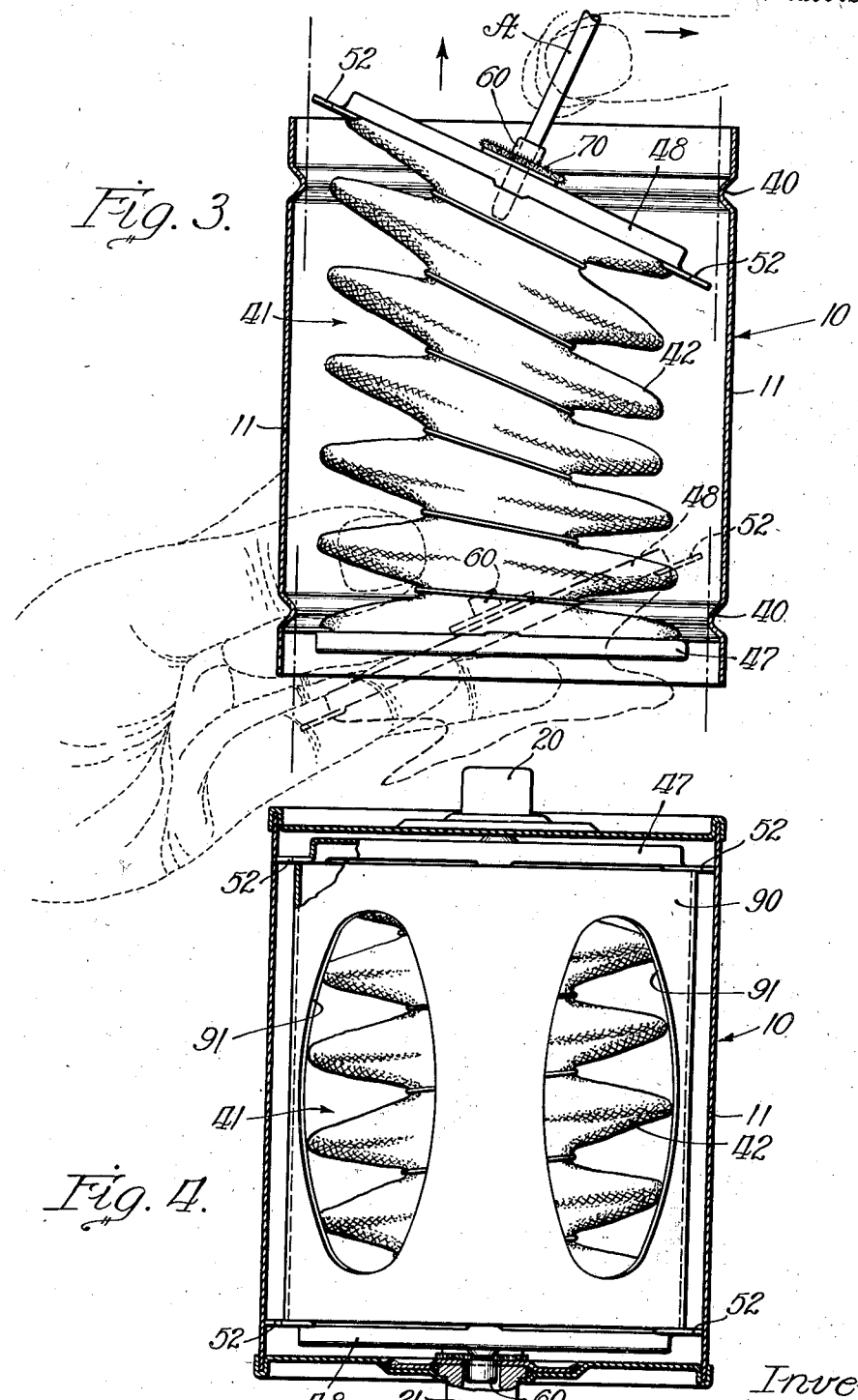

Sept. 10, 1935.    C. H. DOOLEY    2,014,105
FILTER
Filed May 31, 1933    3 Sheets-Sheet 3

Inventor:
Clarence H. Dooley
By: Mason, Jackson, Bottcher, Brenner
Attys.

Patented Sept. 10, 1935

2,014,105

UNITED STATES PATENT OFFICE 2,014,105

FILTER

Clarence H. Dooley, Rock Island, Ill.

Application May 31, 1933, Serial No. 673,631

13 Claims. (Cl. 210—164)

The present invention relates generally to filters, and the principal object of the present invention is the provision of a filter of simple, inexpensive and sturdy construction, and particularly adapted for use in filtering the lubricating oil in automobile motors and the like.

Another object of the present invention is the provision of a filter wherein the filter unit is so constructed and arranged that the same may be easily and quickly assembled within the casing, and the casing being so constructed that there is no waste area on the interior thereof, and which is of simple construction and inexpensive manufacture.

More specifically, the present invention has for its object the provision of a filter embodying a filter unit consisting of a spring helix and a filter bag with heads mounted at the ends thereof before assembly in the casing for the filter, the assembly being accomplished by simply inserting the same into the casing before the casing ends are fixed in place, such insertion being easily and quickly accomplished without riveting, soldering, welding or the like, the filter ends being held in proper spaced apart relation throughout the entire life of the device after the unit has been properly assembled.

Still further, another object of the present invention is the provision of a filter embodying a casing having beads or the like adjacent the ends and a filter unit having heads adapted, when properly inserted in the casing, to rest on said beads and to be positioned thereby, in connection with casing end members rigidly and fixedly secured to the ends of the casing and cooperating with the filter heads to hold the filter unit in position, thus obviating spot welding, soldering, riveting or the like, and producing a structure capable of inexpensive manufacture and easy and convenient assembly. Still further, the present invention contemplates the employment of means other than beads on the filter casing proper for maintaining the filter heads in proper spaced relation.

These and other objects of the present invention will be apparent to those skilled in the art from the following detailed description of the several constructions described below and illustrated in the accompanying drawings.

In the drawings:

Figure 3 is a view similar to Figure 1 but illustrating the manner in which the filtering unit is inserted into the filter casing and held in place therein without spot welding, soldering, riveting or the like;

Figure 4 is a modified form of construction in which a separate auxiliary cylindrical member is provided for maintaining the filter heads in proper spaced relation;

Figure 1:
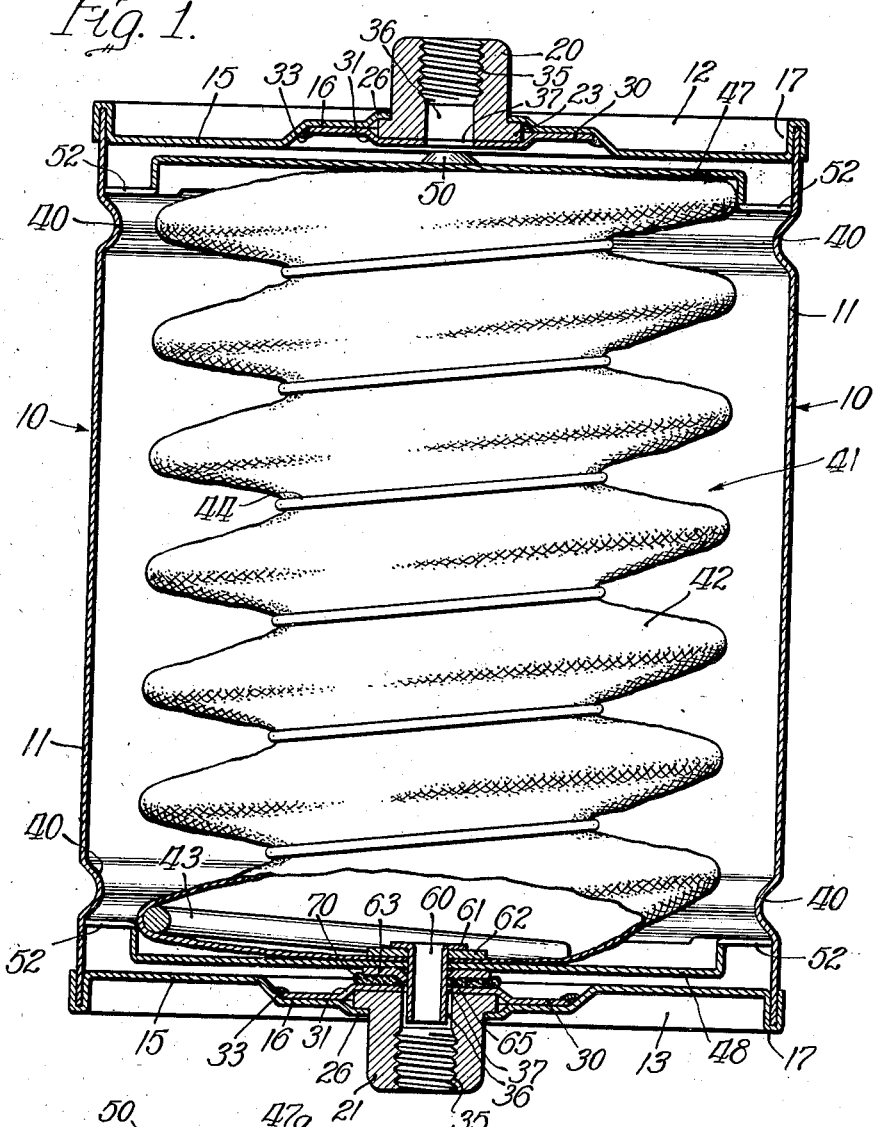
Figure 1 is a vertical section taken through a filter constructed according to the principles of the present invention.
Figure 2:
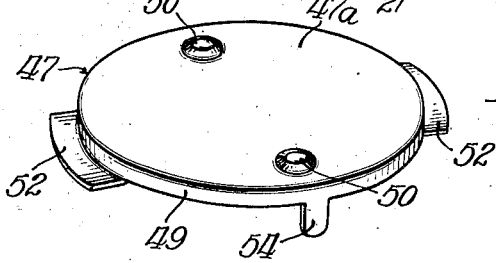
Figure 2 is a perspective of the upper filter head before the same has been attached to one end of the filter bag and the supporting spring helix.

Referring now more particularly to Figures 1 and 2, the casing for the filter comprises a generally cylindrical can, or the like, indicated in its entirety by the reference numeral 10 and comprising a cylindrical member 11 having ends closed by end plates 12 and 13. The casing end members are preferably of identical construction, and each embodies a circular plate 15 having a central recessed portion 16 and a flanged peripheral portion 17 arranged to engage the ends of the cylindrical member 11 and to be soldered or otherwise fixed thereto. Each of the casing end members 12 and 13 is provided with a threaded nipple, one being generally the inlet, as indicated by the reference numeral 20, while the other is generally the outlet, as indicated by the reference numeral 21. Each of the nipples 20 and 21 is provided with a hexagonal head 23, or a similar portion of polygonal configuration, and is disposed in an auxiliary recessed portion 26 of the circular plate 15 and shaped to conform to the polygonal head 23 to prevent the nipple from turning therein. The recessed portion 16 of each of the casing end members is adapted to receive a circular plate 30 having a central recessed portion 31 supplementing the auxiliary recessed portion 26 and embracing the under side of the nipple head to secure the associated nipple to the casing end member. Preferably, the circular plates 30 are soldered or welded to the casing end plates 15, as indicated by the reference numeral 33. Each of the nipples is threaded, as at 35, and is provided with an aperture 36 which registers with an aperture 37 formed in the plate 30 for a purpose which will appear later. Also, the end portions of the casing 11 are beaded or indented, as indicated by the reference numeral 40.

The filter unit is indicated in its entirety by the reference numeral 41 and consists of a bag of filter material 42 closed at its ends and supported on the spring helix 43, being held thereon by a cord, wire, or other member formed as an associated helix 44. The filter unit also includes an upper head 47 and a lower head 48, the upper head being shown in perspective in Figure 2 and comprises a circular plate portion 47a having a flanged periphery 49 and provided with spacing projections or extensions 50, laterally extending lugs 52, preferably extending from and formed integrally with the flanged marginal portion 49, and clamping ears 54, also preferably formed integrally with the marginal flange 49. Not only do the beads 40 serve to strengthen the casing 11, but they also cooperate with the laterally extending lugs 52, as will be described later.

The upper end of the filter bag is closed and the lower end is provided with an opening in which is disposed a tubular member or a tubular rivet 60 having a flanged head 61 and a washer 62 disposed on the inside of the filter bag. The opening in the head 48 receives the rivet 60. A clinch washer 63 is disposed on the outside of the filter bag end and the outside of the head 48 and is provided with a central conical portion 65 which cooperates with the tubular rivet 60 to effectively clamp not only the material of the filter bag itself, but also the filter head 48 between the washer 63 and the head 61 of the rivet. Secured to the clinch washer 63 is a felt gasket 70, or the equivalent, which serves the purpose of preventing oil from leaking into the outlet nozzle 22 from outside the filter bag 42.

When the filter device has been properly assembled in the casing 10 and the casing end members 12 and 13 fixedly secured in place on the ends of the casing, the end of the tubular rivet 60 is disposed in the aperture 36 of the outlet nipple 21. The extensions 50 on the upper head 47 cooperate with the upper casing end member 12 to space the filter head from the inlet opening 37 so that incoming oil will be deflected by the filter head 47 laterally and will pass into the space between the filter bag and the casing 11. Oil filtering through the filter bag 42 will find an outlet through the tubular member or tubular rivet 60 and will pass out of the outlet nipple 21. The nipples 20 and 21 are threaded to provide for the connection thereof with the lubrication system of the machine.

The filter unit 41 is constructed in the following manner:

The tubular rivet 60 and the lower filter head 48 are first secured to the piece of filter material, and then the spring helix 43 is inserted and the bag 42 completed by appropriate stitching. Next, the upper filter head 47 is mounted over the end of the spring helix. Likewise, the end of the spring helix is also disposed in the flanged portion of the lower filter head 48, and then the ears 54 on both of the filter heads are clamped or bent over the end coils of the spring helix. The filter unit or filter element 41 is then completed and is ready to be inserted into the casing 10.

The filter element is inserted into the casing in the manner best illustrated in Figure 3. The cylindrical member 11 is held in one hand with its upper end down. Of course, where the cylindrical member is symmetrical about the transverse axis, it is immaterial which end of the member is held down. Next, the filter unit 41 is held in the other hand with the lower head 48 disposed upwardly. The lower filter head 48 is then tilted to the position shown in dotted lines in Figure 3 so that the lugs 52 can clear the lower bead 40. The filter element is then pressed into the casing 10 until the filter head 48 approaches the opposite bead 40 at the other end of the casing. Next, the operator holds the filter 41 in place, as indicated in Figure 3, and then a suitable tool, indicated by the refernce character A, is inserted into the tubular member 60 and cocked sidewise until the filter head 48 is tilted to the position shown in Figure 3, at which time a pull can be imposed on the filter head by the tool A while, at the same time, maintaining the filter head tilted in the position shown so as to clear the other bead 40. When the helix has been extended sufficiently to allow the filter head 48 to clear the upper bead 40 the filter head 48 is straightened and the hold thereof relaxed so that the tension of the spring helix draws the filter head 48 down against the associated casing bead 40. For this reason it is desirable to have the helix under slight tension so that the filter heads will be drawn against the associated beads 40. When the filter unit is thus assembled within the casing 11 no further operations, such as welding, soldering, or the like, are necessary. The ears or lugs 52 serve not only to space the filter heads 47 and 48 spaced apart in an axial direction, but they also serve to maintain the filter unit as a whole in proper coaxial position with respect to the casing.

The next step is to place the casing end members 12 and 13 over the ends of the cylindrical casing member 11 and to fix the same in place by soldering, welding, or the like. The beads 40 are so disposed with respect to the ends of the casing that when the casing end member 12 is assembled in position, the casing end member contacts with the spacing extensions 50, the latter thus serving as means to prevent the casing end member from being fixed in place too close to the upper filter head 47. In a similar manner, the lower bead 40 is arranged to space the lower filter head 48 in such position that when the lower casing end member 13 is mounted on the lower end of the casing, the central portion of the closure plate 30 contacts with the gasket means 70 with sufficient pressure to prevent leakage of oil at this point, the tubular rivet 60 being received within the opening 36 in the outlet nipple 31 in the manner shown in Figure 1.

It will thus be seen that once the filter has been properly assembled, the filter unit element is securely mounted within the casing and cannot become displaced therein, yet the filter element is effectively reenforced against any alteration of position due to the pressure in the lubrication system or the like, since the end members or filter heads of the filter unit are effectively and rigidly mounted in position on the interior of the casing.

From Figure 2 it will be noted that the disposition of the spacing projections 50 are in a line which is approximately at right angles to the axis of the lugs 52. Remembering that the lugs 52 form the portions of the filter head which rests on and reacts against the bead 40, it will be seen that, by virtue of this construction, there is provided sufficient flexibility to take care of any small manufacturing variations in the distance between the edge or end of the casing element and the bead 2,014,105

40. Also, this disposition of the lugs 52 with respect to the spacing knobs 50 effectively prevents any tendency for the filter head to rock or otherwise change its angular position when once it has been mounted within the casing. The lower filter head 48 may, if desired, be the same as the filter head 47 for purposes of simplicity and economy, but the spacing projections 50 should not be such as to prevent the sealing action between the filter head 48, its gasket means 70, and the casing end member 13. Thus, if desired, the spacing projections 50 may be omitted from the lower filter head 48.

The generic features of the present invention may be expressed in forms other than the construction just described. Broadly considered, of course, the interior beads 40, formed integrally with the cylindrical member 11 of the casing 10, are equivalent to any means disposed on the inside of the casing for maintaining the filter heads in proper position therein. As one alternative construction, the present invention contemplates the provision of a separate cylindrical member, indicated in Figure 4 by the reference numeral 90, and consisting principally of a cylindrical member of uniform construction and provided with relatively large openings 91 to facilitate the movement of the oil into and through the filter bag 42. The filter unit 41, as a whole, is constructed in the same manner as described above, and likewise the unit is assembled within the cylindrical member 90 in substantially the same way, namely, by tilting one of the filter heads so that it may be passed through the cylindrical member and can be pulled through far enough to straighten the head to bring the same to the position shown in Figure 4. Mention was made above of the fact that the lugs 52 serve to space the filter element 41 laterally in the casing. The same result is secured in the construction shown in Figure 4. In Figure 4, the construction and arrangement of the tubular member or rivet 69 is the same as shown in Figure 1, and likewise the same is preferably utilized in assembling the filter unit within the cylindrical member 90 in the same way that the tubular rivet is used in assembling the filter unit in the casing 10 as shown in Figure 3.

Figure 5:
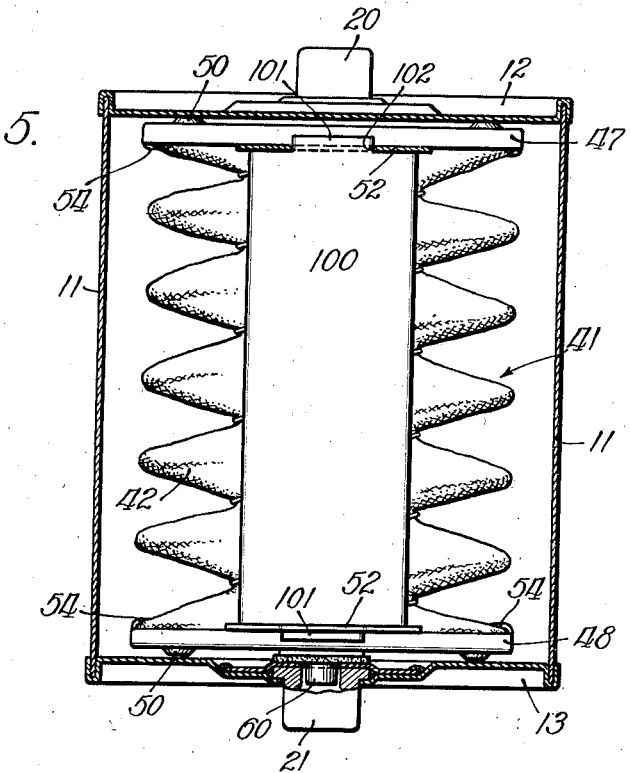
Figure 5 is another modified form in which struts, rather than a generally cylindrical member, are provided for maintaining the filter heads in proper positon.

Figure 5 illustrates another modified form of construction, quite similar in many respects to the form shown in Figure 4, but instead of showing a complete cylinder, such as 90 as shown in Figure 4, a pair of spacing members 100 are provided, each spacing member having a pair of lugs 101 received within openings 102 in the form of slots formed in the ears 52. The members 100 thus act as compression members or struts in resisting the tension within the spring helix of the filter unit 41 and, at the same time, take the reaction arising from the pressure of the casing end members 12 and 13 on the filter heads 47 and 48.

Figure 6:
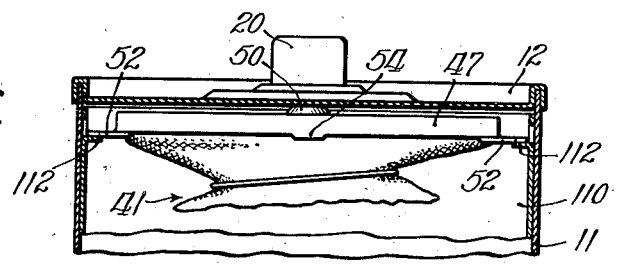
Figures 6 and 7 show other forms employing cylinders, somewhat similar to the auxiliary cylindrical members shown in Figure 4, but illustrating slightly different forms of connections between the cylindrical member and the filter heads.

Figure 6 illustrates another modification in which a complete cylindrical member 110 is provided, similar to the complete cylindrical member 90 shown in Figure 4. In the case of the construction shown in Figure 6, however, the cylindrical member 110 is adapted to snugly fit within the casing 11, and hence no openings 91 are necessary. In Figure 6, the ears 52 on the upper and lower filter heads do not engage over the ends of the auxiliary cylinder 110, but are adapted to engage seats 112 formed by bending a portion of the material of the cylinder inwardly at right angles to the elements of the cylinder. Preferably, these seats are of substantially the same width of the lugs 52 so that the latter may be brought into position thereon by disposing the filter element 41 inside the cylinder 110 and then rotating the same slightly while maintaining it extended.

Figure 7:
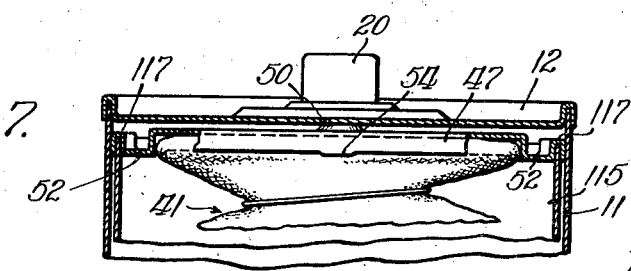

In Figure 7, the cylindrical member 115 is of substantially the same form as shown at 110 in Figure 6, but without the extensions or seats 112. In the construction shown in Figure 7, the lugs 52 are formed with hook-like portions 117 adapted to engage over the ends of the cylinder 115 to space the filter heads axially within the cylinder 115 and the casing 11. In this form, as in the other forms, the filter unit 41 is inserted into the cylinder 115 in substantially the same manner as shown in Figure 3, the hook-like ends 117 engaging over the ends of the cylinder 115 also serving to effectively space the filter heads laterally within the casing 11.

It is to be observed that in Figures 5 to 7, the forms shown all utilize the lugs 52 as the means for spacing the filter heads, and hence for spacing the filter unit as a whole within the enclosing cylinder, whether that cylinder be auxiliary means, as struts, or an additional cylinder, or the walls of the filter casing. Like the cylinder 90, the struts 100 and the cylinders 110 and 115 are so dimensioned that when the filter heads are disposed in proper position within the casing 11, the casing end members 12 and 13 firmly press against the filter heads to maintain the filter unit in proper position within the casing.

While I have described above several constructions in which the principles of the present invention have been embodied, it is to be understood that my invention is not limited to the specific means shown and described, but that, in fact, widely different means may be employed in the practice of the broader aspects of my invention.

What I claim, therefore, and desire to secure by Letters Patent is:

1. A filter comprising a casing, a filter element disposed therein and provided with heads at opposite ends thereof, ears carried by said heads, and means on the interior of said casing and adapted to receive said ears for positioning the heads of said element in spaced apart relation in said casing and for maintaining said heads in said spaced relation.

2. A filter comprising a casing, a filter element disposed therein and including a filter bag supported by a spring helix and provided with heads secured to the helix at opposite ends thereof, a generally cylindrical member embracing said filter element and having end portions receiving said heads to maintain them in spaced apart relation and to prevent the axial compression of said helix under pressure, and means closing the ends of said casing and engaging said heads to maintain said filter element in position in the casing.

3. A filter comprising a can, a filter element disposed therein and provided with heads at opposite ends thereof, laterally directed lugs carried by said heads and adapted to engage the inner walls of said can to position the filter element therein, and means cooperating with the lugs on said heads for maintaining the latter in axially spaced position.

4. A filter comprising a can, a filter element disposed therein and including a filter bag, a spring helix supporting the bag, and plates securing the ends of the bag to the ends of said helix, said spring helix urging said plates for movement toward each other, and means in said can reacting against said plates for limiting said movement.

5. A filter comprising a casing having inwardly directed beads adjacent the ends thereof, a filter element comprising a spring member, a filter bag carried by said member and heads mounted on the ends of said spring member and securing the ends of said bag thereto, and means carried by the heads and reacting against said beads for maintaining said filter element in said casing.

6. A filter comprising a casing having inwardly directed beads adjacent the ends thereof, a filter element comprising a spring member, and a filter bag carried by said member and heads mounted on the ends of said spring member and securing the ends of said bag thereto, said heads having one dimension substantially the same and such that the heads are adapted to rest against said beads, the element being insertible into the casing from one end thereof by tilting at least one of said heads so as to cause it to pass through at least one of the beaded portions of the casing.

7. A filter comprising a casing having inwardly directed beads adjacent the ends thereof, a filter element disposed within said casing and including heads resting against said beads and restrained against inward movement thereby, and end members carried by said casing and having portions pressing inwardly against said heads providing an inlet and an outlet for the casing.

8. A filter comprising a casing, a filter element disposed within said casing and including a filter bag and spring means within the bag and cooperating means on the outside of the bag for maintaining the bag folded to form a plurality of circularly extending fins separated by circularly extending grooves, means connecting the ends of said spring means with said heads with the ends of said bag disposed therebetween, said spring means biasing said heads for movement toward each other, means for maintaining said heads in spaced relation, there being spacing projections carried by at least one of said heads, and end members carried by said casing, one of said end members having an inlet connection and engaging the spacing projections on said one head.

9. A filter comprising, in combination, a casing, a filter element including a filter bag disposed therein and adapted to be subjected exteriorly to pressure, a spring helix disposed on the interior of said filter bag, end members mounted on the ends of said spring helix outside the bag, lugs on said members formed to embrace the end coils of said spring helix and to clamp said members and the ends of the filter bag thereto, and means carried by the casing and against which said members react in preventing collapse of said spring helix.

10. A filter comprising, in combination, a casing, a filter element including a filter bag disposed therein and adapted to be subjected exteriorly to pressure, a spring helix disposed on the interior of said filter bag, end members mounted on the ends of said spring helix outside the bag, said members comprising circular plates having flanges against which the ends of the filter bag and said spring helix seat, means clamping said plates over the ends of said filter bag and the spring helix therein, and means carried by the casing and against which said members react in preventing collapse of said spring helix.

11. As an article of manufacture, a head for enclosing the end of a filter element and comprising a circular plate having a peripheral flange and integral clamping ears extending from the flange of the plate and spacing protrusions carried by the body of the plate laterally inwardly from the edge thereof and extending outwardly from the general plane of the latter.

12. As an article of manufacture, a head for enclosing the end of a filter element and comprising a circular plate having a peripheral flange and integral clamping ears and lateral spacing lugs extending from the flange of the plate and spacing protrusions carried by the body of the plate laterally inwardly from the edge thereof and extending outwardly from the general plane of the latter.

13. A filter comprising a casing having a separable head at one end, a filtering unit in said casing, said unit comprising a helix, an envelope of filtering material surrounding the helix, end members clamped to the ends of said helix and serving to hold said envelope thereon, means cooperating with said end members for holding said filtering unit against axial collapse, inlet and outlet ports comprising a port communicating between the unit and the casing wall and a second port communicating with the interior of the envelope of said unit, said second port comprising a nipple extending through an opening in the envelope, means including a clinching ring clinched to the nipple for preventing leakage around the nipple receiving opening in the envelope, said nipple telescoping into the head of the casing and retractible therefrom by a longitudinal motion, and means reacting against the casing to prevent the retraction of the nipple.

CLARENCE H. DOOLEY.